United States Patent [15] 3,653,002

Goffee

[45] Mar. 28, 1972

[54] NONVOLATILE MEMORY CELL

[72] Inventor: James A. Goffee, Cambridge, Ohio

[73] Assignee: The National Cash Register Company, Dayton, Ohio

[22] Filed: Mar. 2, 1970

[21] Appl. No.: 15,632

[52] U.S. Cl. ....................340/173, 307/279

[51] Int. Cl. ....................G11c 11/38

[58] Field of Search ....................340/173; 317/235; 307/279

[56] References Cited

UNITED STATES PATENTS 3,387,286 6/1968 Dennard ....................340/173

OTHER PUBLICATIONS

Vol. 41 No. 22 Oct. 28, 1968 Electronics Review " Integrated Electronics–Toward MOS Memories" pages 49–50

*Primary Examiner*—Robert L. Griffin
*Assistant Examiner*—Barry Leibowitz
*Attorney*—Louis A. Kline, John J. Callahan and John P. Tarlano

[57] ABSTRACT

The present invention relates to a nonvolatile memory cell having an MOS control transistor electrically connected to the gate electrode of an MNOS memory transistor. The nonvolatile memory cell may be set by momentarily applying a set potential to the MNOS memory transistor using the MOS control transistor, to which a pass potential is applied. The nonvolatile memory cell may be reset by momentarily applying a reset potential to the MNOS memory transistor using the volatile MOS control transistor, to which a pass potential is applied.

4 Claims, 9 Drawing Figures

INVENTOR
JAMES A. GOFFEE

BY

HIS ATTORNEYS

PATENTED MAR 28 1972

3,653,002

INVENTOR
JAMES A. GOFFEE

BY Louis A. Kline
John J. Callahan
John P. Tarlano
HIS ATTORNEYS

INVENTOR
JAMES A. GOFFEE

BY

Louis A. Kline
John J. Callahan
John P. Tarlano

HIS ATTORNEYS

INVENTOR
JAMES A. GOFFEE

BY Louis A Kline
John J. Callahan
John P. Tarlano
HIS ATTORNEYS

NONVOLATILE MEMORY CELL

BACKGROUND OF THE INVENTION

In the prior art, Robert H. Dennard, in U.S. Pat. No. 3,387,286, issued June 4, 1968, discloses a volatile memory cell having an MOS control transistor connected to an MOS memory transistor. When the MOS control transistor of the memory cell is made conducting, gate capacitance of the MOS memory transistor is charged, making the MOS memory transistor potentially conducting. However, the gate capacitance of the MOS memory transistor soon discharges. A memory cell using an MOS memory transistor is therefore a volatile memory cell.

In the memory cell of the present invention, an MOS control transistor is connected to an MNOS memory transistor. A positive potential may be passed through the MOS control transistor by applying a pass potential thereto and onto the gate electrode of the MNOS memory transistor. The MNOS memory transistor has a thin silicon oxide insulator layer beneath a thicker silicon nitride insulator layer, both of which are beneath its gate electrode. Some electrons beneath the silicon oxide insulator layer are trapped in the silicon nitride insulator layer of the MNOS memory transistor when a set potential is applied to its gate electrode. The trapped electrons cause the MNOS memory transistor to be set. The nonvolatile MNOS memory transistor will remain set for a long time. The set condition of the MNOS memory transistor may be sensed by means of a read potential applied to its source electrode.

A reset potential may be passed through the MOS control transistor by applying a pass potential to its gate electrode. The reset potential is then passed to the gate electrode of the MNOS memory transistor. Electrons within the silicon nitride insulator layer of the MNOS memory transistor are then driven back into the semiconductor material thereunder. The MNOS memory transistor is thus returned to its reset condition. The reset condition of the MNOS memory transistor may be sensed by applying a read potential to its gate electrode.

SUMMARY OF THE INVENTION

A memory cell comprising an MNOS memory transistor having a permanently ionizable insulator layer therein, and an MOS control transistor, whose drain electrode is electrically connected to the gate electrode of the MNOS memory transistor, to control the passage of a set potential or reset potential to the MNOS memory transistor.

An object of the present invention is to provide a nonvolatile memory cell having an MOS control transistor for controlling the setting and resetting of an MNOS memory transistor.

Another object of the present invention is to provide an array of nonvolatile memory cells for setting or resetting any MNOS memory transistor therein using a paired MOS control transistor.

DESCRIPTION OF THE PREFERRED EMBODIMENT

Figure 1:
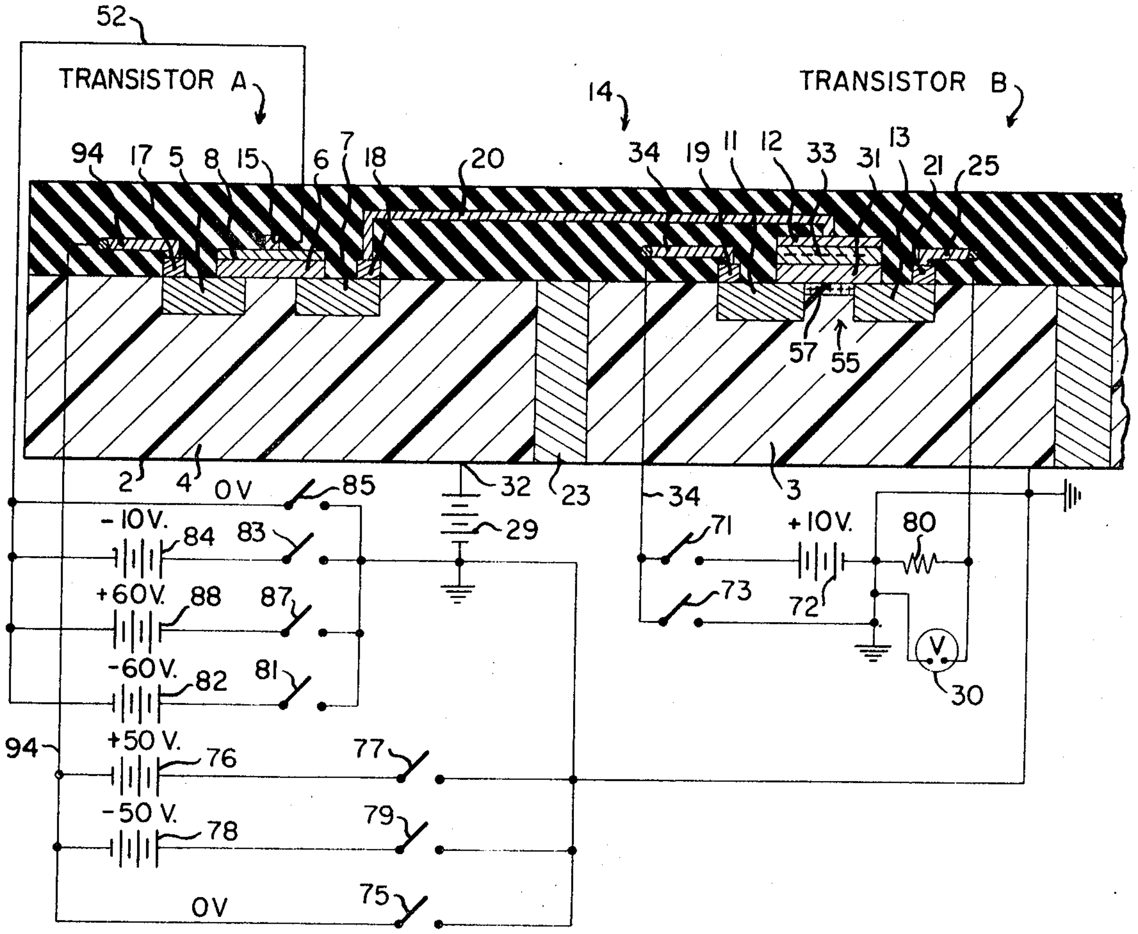
FIG. 1 is a cross-sectional view of a nonvolatile memory cell having an MOS control transistor and an MNOS memory transistor.

As shown in FIG. 1, an MOS control transistor A is formed in section 4 of an N-type silicon wafer 2. An MNOS memory transistor B is formed in section 3 of the N-type silicon wafer 2. Within section 4 of the N-type silicon wafer 2, P-type regions 5 and 7 are formed, by diffusion of dopant atoms therein. A 10,000-angstrom-thick silicon dioxide insulator 6 is formed upon and between the P-type regions 5 and 7, by thermal oxidation of the silicon wafer 2. A gate electrode 8, such as an aluminum gate electrode, is evaporated upon said silicon dioxide insulator layer 6. A source electrode terminal 17 is connected to the P-type region 5, and a drain electrode terminal 18 is connected to the P-type region 7. A gate electrode terminal 15 is connected to the gate electrode 8. The MOS control transistor A is thus formed in section 4 of the N-type silicon wafer 2.

Two P-type regions 11 and 13 are diffused within section 3 of the N-type silicon wafer 2. A 52.5-angstrom-thick silicon oxide layer 31 is formed, by thermal oxidation, between the P-type regions 11 and 13. A 1,000-angstrom-thick silicon nitride insulator layer 33 is formed upon the silicon oxide layer 31, by the reaction of ammonia and silane. A gate electrode 12, such as an aluminum gate electrode, is evaporated upon the silicon nitride insulator layer 33.

A source electrode 19 terminal is vacuum-deposited upon the P-type region 11, and a drain electrode 21 terminal is vacuum-deposited upon the P-type region 13. The MNOS memory transistor B is thus formed in section 3 of the N-type silicon wafer 2.

The MOS control transistor A, in section 4, is electrically isolated from the MNOS memory transistor B, in section 3, by means of a P-type region 23. The P-type region 23 is used to prevent conduction from section 4 to section 3. A bridging conductor 20 connects the electrode terminal 18 of the MOS control transistor A to the gate electrode 12 of the MNOS memory transistor B to form a memory cell 14.

A battery 29 is used to prevent a set current from passing from the P-type region 5 through section 4. Section 4, having the MOS control transistor A, is placed at +50 volts by means of the battery 29. Section 3, having the MNOS memory transistor B, is placed at ground potential, since a set current cannot pass therethrough.

The memory cell 14 of FIG. 1 is formed of the MOS metal-oxide-silicon field effect control transistor A and the metal-nitride-oxide-silicon (MNOS) field effect memory transistor B. The MOS control transistor A includes a gate electrode 8, to which a pass potential may be applied to control current flow between a source terminal 17 and a drain terminal 18. A base connection is made to section 4, in which the MOS control effect transistor A is formed, and this connection is shown at 32. The MOS control transistor A is an insulated-gate field-effect transistor. The MOS control transistor A is formed on a substrate 2 of silicon which is N-type. The source and drain regions 5 and 7 are doped to be P-type and are at the surface to provide planar construction. These two P-type regions 5 and 7 are connected by a channel at the surface of the substrate wafer 2, which is located immediately beneath the gate electrode 8, when a negative pass potential is applied between the gate electrode 8 and the more positive of the P-type regions 5 and 7. The MOS control transistor A is an enhancement type, by which is meant that the channel between the source and drain regions 5 and 7 is normally non-conducting and is rendered conducting by the application of a negative signal to the gate electrode 8 with respect to the more positive of the P-type regions 5 and 7. For conduction to occur, there must be a voltage difference between the terminals 17 and 18, and the gate voltage must be less than the voltage at the more positive of these terminals by the threshold voltage for the MOS control transistor A. The practice of the invention is not limited to an enhancement mode PNP-structure, since an NPN-field-effect device can also be used as a control transistor. Depletion mode devices, in which the channel between source and drain is normally conducting and is rendered non-conducting by gate signals, can also be employed with appropriate changes in the voltages applied to the circuitry for controlling inputs to the MOS memory transistor B.

Referring to the memory cell 14 of FIG. 1, the state of the cell, either set or reset, is determined by the charge 17 in the silicon nitride insulator layer 33 of the MNOS memory transistor B. When the memory cell 14 is reset, there is essentially no stored charge in the silicon nitride layer 33. When the memory cell 14 is set, the silicon nitride layer 33 is charged. Thus the storage element in the memory cell 14 is the silicon nitride layer 33, and a memory cell 14 is set or reset according to whether or not this silicon nitride layer 33 is charged. In the set state of the memory cell 14, a charge which has been stored in the silicon nitride layer 33 is maintained, due to the fact that it is very difficult for electrons in the silicon nitride layer 33 to tunnel through the silicon oxide layer 31 into the P-type channel region 57. Thus charge in the silicon nitride layer 33 can be stored for a period of months.

During a set operation carried out on the memory cell 14, the voltage on write-*x*-select line 52 is changed to zero volts from +60 volts, as shown in FIG. 2A IV. This pass voltage is applied to the gate electrode 8 for the MOS control transistor A. The zero-volt pass voltage applied to the gate electrode 8 produces a P-type channel connecting the P-type source region 5 and the P-type drain region 7 in the transistor A, when a +50-volt set voltage is simultaneously applied to the P-type region 5 from write-*y*-select line 94. The cell 14 is thus set.

Figure 3:
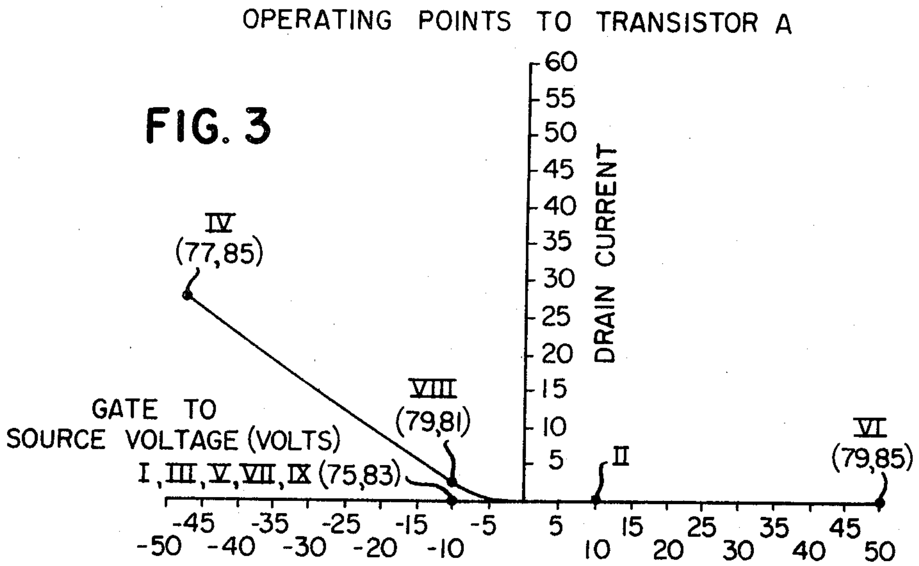
FIG. 3 is a diagrammatical view of the voltage characteristics used in operating the MOS control transistor of FIG. 1.
Figure 4:
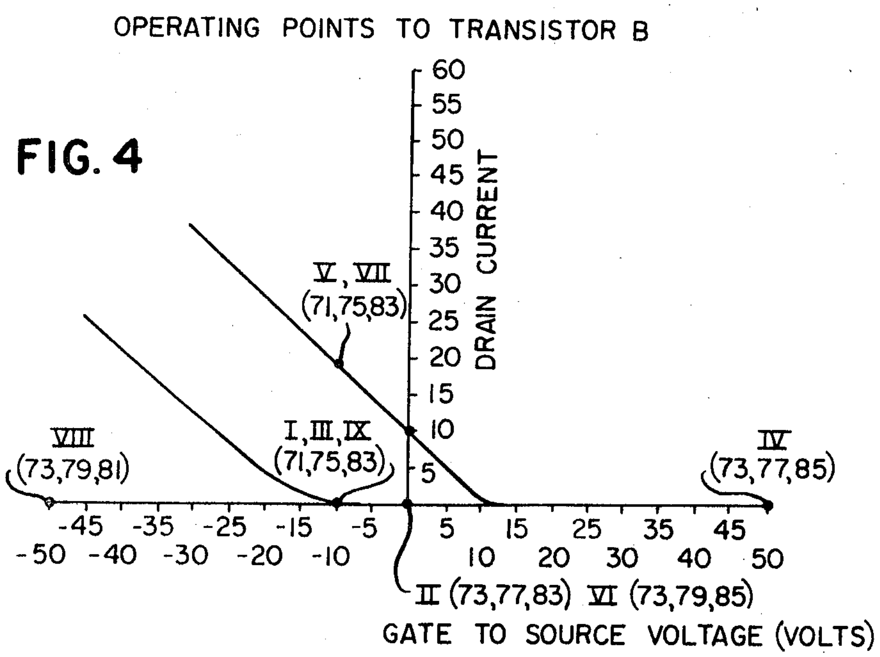
FIG. 4 is a diagrammatical view of the voltage characteristics used in operating the MNOS memory transistor of FIG. 1.

The silicon nitride layer 33 is negatively charged by having placed a positive 50 volts set potential on the *y*-select line 94, as shown in FIG. 2B IV. The MOS control transistor A was rendered conductive under these conditions, and the characteristic curve of the MNOS memory transistor B is shifted to the right, as shown in FIG. 4. The operating point of the control transistor A at point IV is shown in FIG. 3.

Figure 2:
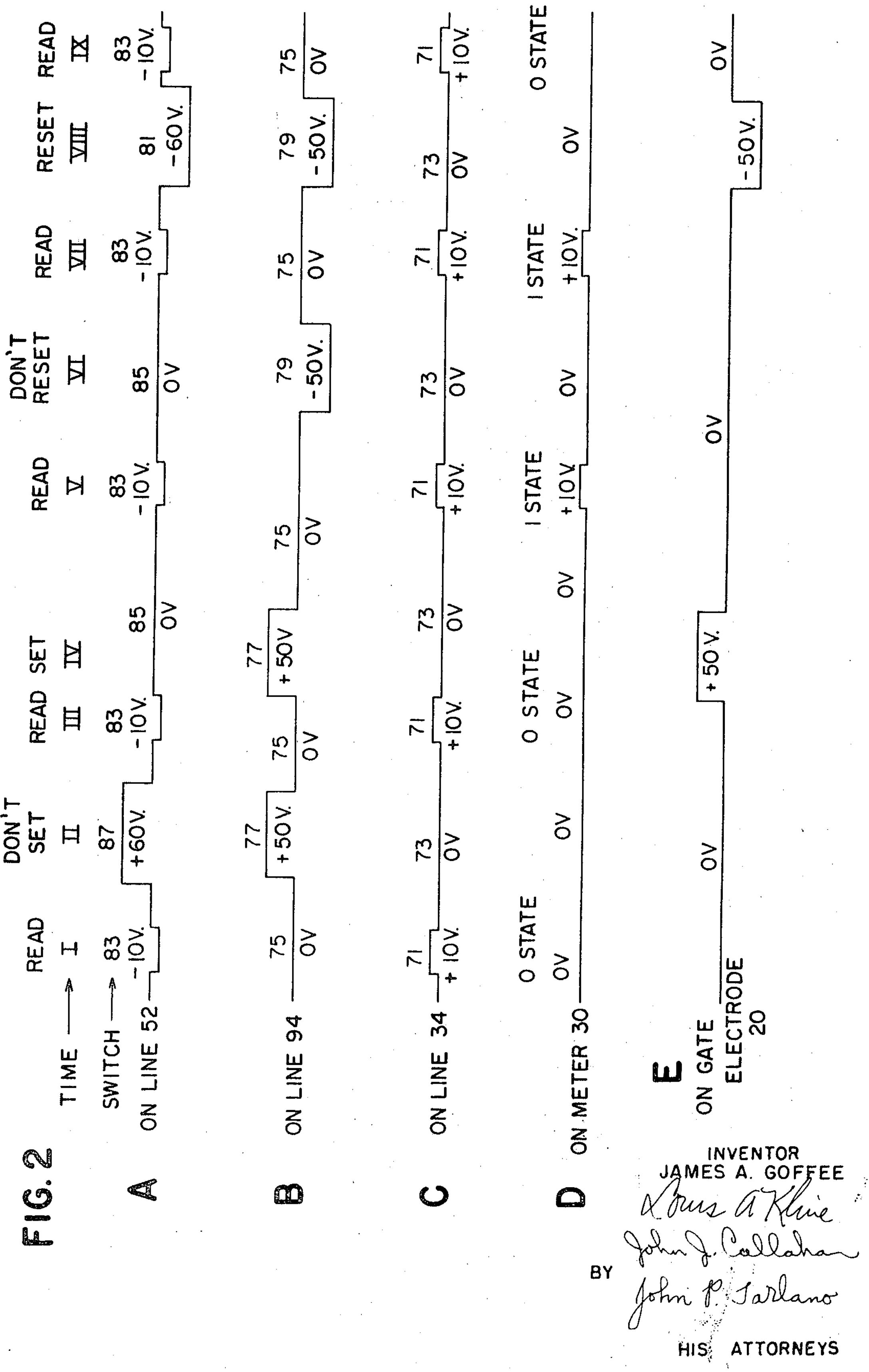
FIGS. 2A through 2E are the pulse sequence diagrams of the writing and reading of the MNOS memory transistor of FIG. 1 using the MOS control transistor of FIG. 1.

A reset operation is shown at time VIII of FIG. 2. The memory cell 14 is reset when a minus 60-volt pass voltage is placed on the gate electrode 8 of the MOS control transistor A. A minus 50-volt reset potential is simultaneously placed on the P-type region 5 of the MOS control transistor A using write-*y*-select line 94. Since region 7 is at a higher potential than the gate electrode 8, a P-type channel region is formed between P-type region 5 and P-type region 7. The voltage of P-type region 7 is pulled down to minus 50 volts. A positive current is passed from P-type region 7 to P-type region 5, since P-type region 5 is approximately at ground potential. Looking at the operation of the MOS control transistor A from a microscopic point of view, electrons flow from P-type region 5, through the P-type channel in the silicon semiconductor material under the gate electrode 8, to P-type region 7. The electrons continue to flow through the bridging conductor 20 to the gate electrode 12 of the MNOS memory transistor B. These electrons, when on the gate electrode 12, cause the electrons in the silicon nitride insulator layer 33 to be driven back into the P-type channel region 57. These electrons combine with the ionized atoms in the P-type channel region 57 to destroy the P-type channel region 57.

If a minus 10-volt potential rather than a minus 60-volt pass potential is placed on the gate electrode 8 of the MOS control transistor A, at time IV of FIG. 2, when a minus 50-volt reset potential is placed on the P-type region 5, the MNOS memory transistor B will not be reset. This is because the gate electrode 12 will only be driven to minus 10 volts. The channel region 57 in the silicon nitride layer 33 will not be deionized. Therefore the gate electrode 8 must be more negative than minus 50 volts to completely deionize the silicon nitride insulator layer 33 at time IV of FIG. 2 to reset the MNOS memory transistor B. Thus the memory cell 14 may be reset only when a potential less than minus 50 volts is placed on the gate electrode 8 of the MOS control transistor A, such as at time IV of FIG. 2. The coincidence of a minus 60 volts on the gate electrode 8 with a minus 50 volts on the region 5 effects the resetting of the MNOS memory transistor B. Without the use of the MOS control transistor A ahead of the MNOS memory transistor B in the circuit of FIG. 1, the setting and resetting of the MNOS memory transistor B cannot be controlled. An MOS control transistor A must be used in the memory cell 14 to selectively set or reset such memory cells 14, when they are in an integrated circuit array. The selection of certain memory cells 14, when they are in an integrated circuit array, is useful when the integrated circuit is part of a digital computer information storage memory.

To read the state of the memory cell 14, a positive 10 volts is placed in the write-*x*-select line 52, as shown in FIG. 2A V. The write-*y*-select line 94 is held at zero volts, as shown in FIG. 2B V. The gate electrode 12 is thus stabilized to ground potential. A plus 10-volt pulse is placed on the read-*y*-select line 34, as shown in FIG. 2C V. A sense-out signal is delivered to the sense-out line 25. The sense-out line 25 is connected to the drain terminal 21 for the MNOS memory transistor B. This signal is transmitted via the line 25 to the sense-out unit 30 for the memory cell 14. The sense-out unit 30 indicates that the memory cell 14 is set, as shown in FIG. 2D V. This information can be transmitted to other portions of data-processing equipment to which the memory cell 14 is connected.

If a positive 10-volt pulse is applied to the read-*y*-select line 34, as shown in FIG. 2C III, and the memory cell 14 is set (that is, the silicon nitride layer 33 has little or no charge therein), no current will pass through the MNOS memory transistor B, as shown in FIG. 2 D III. The sense-out line 25 will not send a voltage to the sense-out unit 30.

FIG. 3 shows the operating points of the MOS control transistor A at the time I to IX of FIG. 2. The points of operation of the MOS control transistor A are also designated by the numbers of the switches of FIG. 1 which are closed to make the MOS control transistor operate at an operating point. These switches correspond to the switches which are closed at the times I to IX of FIG. 2 to produce the pulses shown in FIG. 2.

FIG. 4 shows the operating points of the MNOS transistor B at the times I to IX of FIG. 2. The operating points of the MNOS memory transistor B shown in FIG. 4 are also designated by the switches of FIG. 1 which are closed to make the MNOS memory transistor B have the designated operating points. The MNOS memory transistor's operating point is partially governed by the operating point of the MOS control transistor A, since the voltage of the gate electrode 12 of the MNOS memory transistor is governed by the voltage of the electrode terminal 18 of the MOS control transistor.

Figure 5:
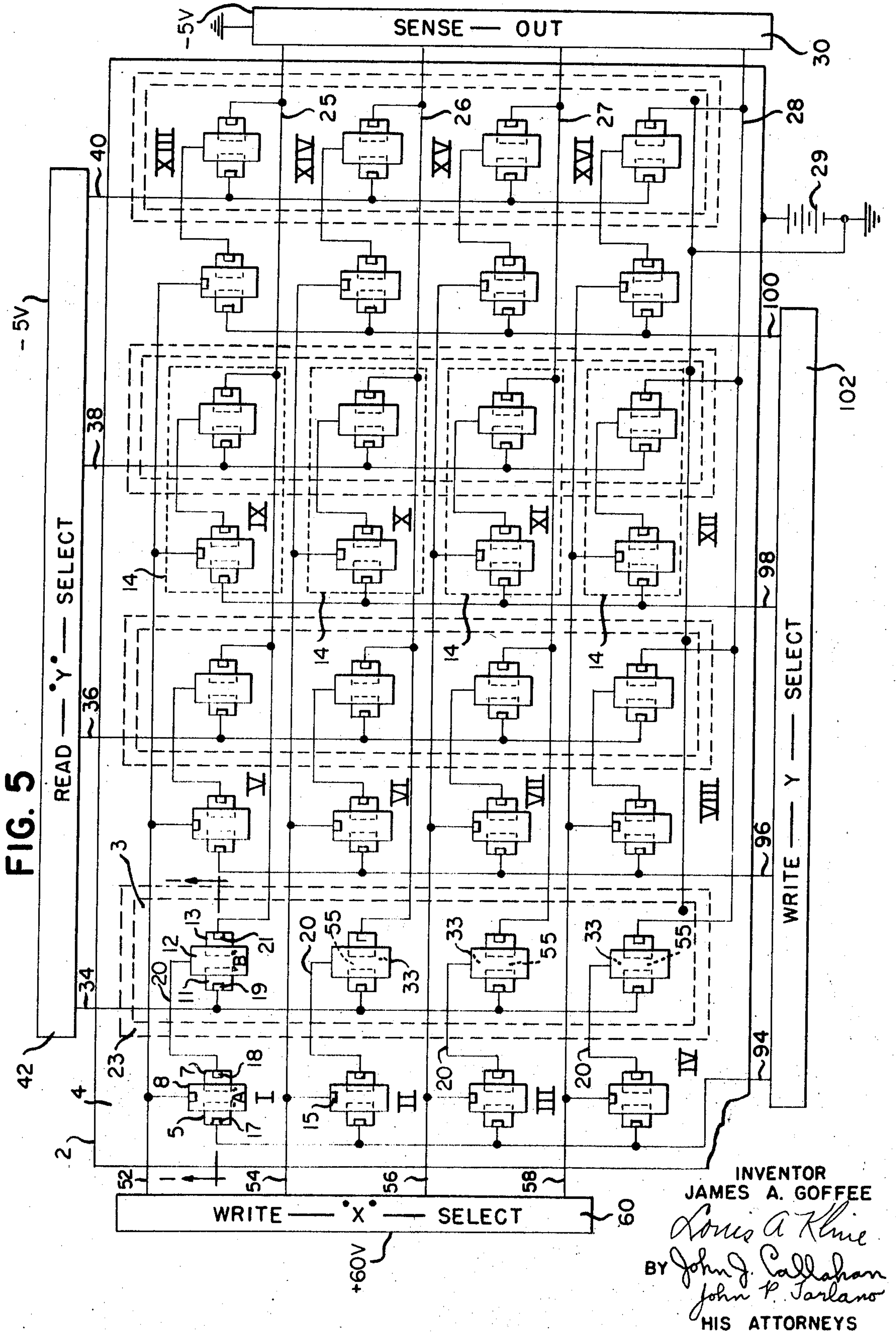
FIG. 5 is a plan view of an array of nonvolatile memory cells, each cell having an MOS control transistor and an MNOS memory transistor.

As shown in FIG. 5, a rectangular array of nonvolatile memory cells 14 is shown. Each memory cell 14 is composed of an MOS control transistor A and an MNOS memory transistor B. All of these field effect transistors A and B are built into an N-type silicon wafer 2, in integrated form. The MOS control transistor columns are electrically isolated from the MNOS memory transistor columns by P-type channel regions 23 in the N-type silicon wafer 2. The rows of the drain electrode terminals 21 of the MNOS memory transistors are connected together by sense-out lines 25, 26, 27, and 28. Each sense-out line is connected to a sense-out unit 30. The sense-out unit 30 senses for which MNOS memory transistors in a given column are in a set state, at a time that the column is probed by a read pulse from a read-*y*-select line 34, 36, 38, or 40. The source electrode terminals 19 in each column of MNOS memory transistors are connected by read-*y*-select lines 34, 36, 38, and 40. A plus 10-volt read potential is placed on a given read-*y*-select line, and a zero voltage is placed on the sense-out unit 30, to determine which MNOS memory transistors in a column of MNOS memory transistors is set.

The gate electrode 12 of the MNOS memory transistors B are connected to the electrode terminals 18 of the leftwardly adjacent MOS control transistors by means of bridging conductors 20. The bridging conductors 20 are used to convey a set voltage or a reset voltage to the MNOS memory transistors from their associated MOS control transistors.

A set voltage or a reset voltage may be placed on a selected MNOS memory transistor of the array of FIG. 5 by properly addressing the MOS control transistor connected thereto through a bridging conductor 20. Each MOS-MNOS transistor pair in the array of FIG. 5 behaves just like the memory cell 14 of FIG. 1. The columns of electrode terminals 17 of the MOS control transistors are connected together by write-*y*-select lines 94, 96, 98, and 100. The rows of gate electrodes 8 of the MOS control transistors are connected together by write-*x*-select lines 52, 54, 56, and 58.

A plus 50-volt set potential is placed on the write-*y*-select line 94, and a zero-volt pass voltage, rather than a plus 60-volt don't pass voltage, is simultaneously placed on the write-*x*-select line 54. The MNOS memory transistor cell II is set. A plus 60-volt don't pass potential is simultaneously placed on the write-*x*-select lines 52, 56, and 58. The MNOS memory transistors in cells I, III, and IV remain reset.

A plus 50-volt set potential is placed on the write-*y*-select line 98, and a zero-volt potential is placed on the write-*x*-select lines 52, 54, and 56. The MNOS memory transistors in cells IX, X, and XI are set. A plus 60-volt don't pass potential is placed on the write-*x*-select line 58. The MNOS memory transistor in cell XII remains reset.

A minus 50-volt reset potential is thereafter placed on the write-*y*-select line 98. A minus 60-volt pass potential is simultaneously placed on the line 54. The MNOS memory transistor in cell X is reset. A zero-volt don't pass potential is placed on the write-*x*-select lines 52, 56, and 58. The MNOS memory transistors in cells IX and XI remain set. The MNOS memory transistor in cell XII remains reset.

A plus 10-volt read potential is placed on the read-*y*-select line 38. A minus 10-volt potential is placed on the lines 52, 54, 56, and 58. A zero-volt potential is placed on the line 98. A zero-volt potential is placed on the sense-out unit 30. The MNOS memory transistors in cells IX and XI are read as set. The MNOS memory transistors in cells X and XII are read as reset.

The nonvolatile memory cells 14 in the memory array of FIG. 5 may therefore be selectively set or reset by means of the MOS control transistors used therein. The memory array may have binary information permanently stored in a given cell location therein. The state of the MNOS memory transistors in any column therein may be read to determine which nonvolatile memory cells are set and which nonvolatile memory cells are reset.

What is claimed is:

1. An integrated circuit array of nonvolatile memory cells comprising:

a. a silicon wafer of a first conductivity type;
b. columns of MNOS memory transistors, each having a permanently ionizable insulator layer therein, built into said silicon wafer;
c. columns of fixed threshold control transistors also built into said silicon wafer, with a column of said fixed threshold control transistors being associated with each of said columns of MNOS memory transistors, said columns of said fixed threshold control transistors being disposed in said silicon wafer alternately with respect to said columns of MNOS memory transistors, the drain electrode of each fixed threshold control transistor in one column being electrically connected to the gate electrode of an MNOS memory transistor in an adjacent column, to control the application of a set potential to any one of the MNOS memory transistors in said adjacent column of MNOS memory transistors; and
d. an isolation region of opposite conductivity to said first conductivity in said silicon wafer between said columns of MNOS memory transistors and said columns of fixed threshold control transistors.

2. An integrated circuit array of nonvolatile memory cells having means for setting or resetting a selected memory cell of said integrated circuit array without affecting the other nonvolatile memory cells in said integrated circuit array, comprising:

a. a silicon wafer of a first conductivity type;
b. columns of MNOS memory transistors, each having a permanently ionizable insulator layer therein, built into said silicon wafer;
c. columns of fixed threshold control transistors also built into said silicon wafer, with a column of said fixed threshold control transistors being associated with each of said columns of MNOS memory transistors, said columns of said fixed threshold control transistors being disposed in said silicon wafer alternately with respect to said columns of MNOS memory transistors, the drain electrode of each fixed threshold control transistor in one column being electrically connected to the gate electrode of an MNOS memory transistor in an adjacent column, to control the application of a set potential or a reset potential to any one of the MNOS memory transistors in said adjacent column of MNOS memory transistors; and
d. an isolation region of opposite conductivity to said first conductivity isolation in said silicon wafer between said columns of MNOS memory transistors and said columns of fixed threshold control transistors;
e. first electrical means connected to gate electrodes of rows of said fixed threshold control transistors for conducting a set potential therethrough to the gate electrodes of a selected row of MNOS memory transistors;
f. second electrical means connected to the source electrodes of said columns of said fixed threshold control transistors for applying a set potential through conductive fixed threshold control transistors to the gate electrodes of their MNOS memory transistors, to permanently set these MNOS memory transistors by ionizing the insulator layers of these MNOS memory transistors;
g. third electrical means connected to said rows of the gate electrodes of said fixed threshold control transistors for conducting a reset potential therethrough; and
h. fourth electrical means connected to the source electrodes of said columns of said fixed threshold control transistors for applying a reset potential through conductive fixed threshold control transistors to the gate electrodes of their associated MNOS memory transistors, to permanently reset these MNOS memory transistors by deionizing the insulator layers of these MNOS memory transistors.

3. An integrated circuit array of nonvolatile memory cells for setting or resetting any one nonvolatile memory cell of said integrated circuit array without affecting any other nonvolatile memory cell of said integrated circuit array, comprising:

a. a silicon wafer of a first conductivity type;
b. spaced columns of MNOS memory transistors, each having a permanently ionizable insulator layer therein, built into said silicon wafer;
c. columns of fixed threshold control transistors interdigitated with said spaced columns of MNOS memory transistors also built into said silicon wafers, with a column of said fixed threshold control transistors being associated with each of said columns of MNOS memory transistors, said columns of said fixed threshold control transistors being disposed in said silicon wafer alternately with respect to said columns of MNOS memory transistors, the drain electrode of each fixed threshold control transistor in one column being electrically connected to the gate electrode of an MNOS memory transistor in an adjacent column, to control the application of a set potential or a reset potential to selected MNOS memory transistors in said adjacent column of MNOS memory transistors; and
d. an isolation region of opposite conductivity to said first conductivity in said silicon wafer between said columns of MNOS memory transistors and said columns of fixed threshold control transistors;
e. write-*x*-select means connected to the gate electrodes of rows of said fixed threshold control transistors for conducting a set potential or a reset potential therethrough to the gate electrodes of a selected row of MNOS memory transistors; and f. write-*y*-select means connected to the source electrodes of said columns of said fixed threshold control transistors for applying a set potential through said conductive fixed threshold control transistors to the gate electrodes of their associated MNOS memory transistors to place said associated MNOS memory transistors in a set state, or for simultaneously applying a reset potential through said conductive fixed threshold control transistors to the gate electrodes of their associated memory transistors, to place said MNOS memory transistors in a reset state.

4. An integrated circuit array of nonvolatile memory cells for setting or resetting a selected nonvolatile memory cell within said integrated circuit array and for also reading the state of a selected nonvolatile memory cell within said integrated circuit array, comprising:

a. a silicon wafer of a first conductivity type;

b. spaced columns of MNOS memory transistors, each having a permanently ionizable insulator layer therein, built into said silicon wafer;

c. columns of fixed threshold control transistors also built into said silicon wafer, with a column of said fixed threshold control transistors being associated with each of said columns of MNOS memory transistors, said columns of said fixed threshold control transistors being disposed in said silicon wafer alternately with respect to said columns of MNOS memory transistors, the drain electrode of each fixed threshold control transistor in one column being electrically connected with the gate electrode of an MNOS memory transistor in an adjacent column, to control the application of a set potential or a reset potential to any one of the MNOS memory transistors in said adjacent column of MNOS memory transistors; and d. an isolation region of opposite conductivity to said first conductivity in said silicon wafer between said columns of MNOS memory transistors and said columns of fixed threshold control transistors;

e. write-*x*-select means connected to the gate electrodes of rows of said fixed threshold control transistors for conducting a set potential or a reset potential therethrough to the gate electrode of a selected MNOS memory transistor;

f. write-*y*-select means connected to the source electrodes of said columns of said fixed threshold control transistors for applying a set potential through said conductive fixed threshold control transistors to the gate electrodes of their associated MNOS memory transistors to place said associated MNOS memory transistor in a set state, or for applying a reset potential through said conductive fixed threshold control transistors to the gate electrodes of their associated MNOS memory transistors, to place said MNOS memory transistors in a reset state;

g. read-*y*-select means connected to columns of the source electrodes of said MNOS memory transistors for passing a current through any set MNOS transistor of a column of MNOS memory transistors; and h. sense-out means connected to rows of the drain electrodes of said MNOS memory transistors for sensing for the passage of current through the MNOS memory transistors in any column of MNOS memory transistors to determine which MNOS memory transistors in said column are set and which are reset.

* * * * *